(12) United States Patent
Harada et al.

(10) Patent No.: US 8,681,092 B2
(45) Date of Patent: Mar. 25, 2014

(54) INPUT DEVICE

(75) Inventors: Keita Harada, Shinagawa (JP); Satoshi Sakurai, Shinagawa (JP); Nobuo Yatsu, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 932 days.

(21) Appl. No.: 11/277,785

(22) Filed: Mar. 29, 2006

(65) Prior Publication Data
US 2006/0221052 A1 Oct. 5, 2006

(30) Foreign Application Priority Data

Mar. 29, 2005 (JP) .................................. 2005-096373

(51) Int. Cl.
*H02K 41/02* (2006.01)
*G09G 5/00* (2006.01)
*G06F 3/033* (2013.01)

(52) U.S. Cl.
USPC .......................... 345/156; 345/161; 310/12.19

(58) Field of Classification Search
USPC .................... 345/156–161, 168–169; 227/113
See application file for complete search history.

(56) References Cited

U.S. PATENT DOCUMENTS

| | | | |
|---|---|---|---|
| 4,641,065 A * | 2/1987 | Shibuki et al. | 318/135 |
| 4,808,955 A * | 2/1989 | Godkin et al. | 335/222 |
| 4,882,837 A * | 11/1989 | Higuchi | 29/719 |
| 4,910,486 A * | 3/1990 | Yumura et al. | 335/222 |
| 5,440,183 A * | 8/1995 | Denne | 310/12.26 |
| 6,124,775 A * | 9/2000 | Linkner, Jr. | 335/278 |
| 6,307,285 B1 * | 10/2001 | Delson et al. | 310/14 |
| 6,353,427 B1 * | 3/2002 | Rosenberg | 345/156 |
| 6,734,785 B2 * | 5/2004 | Petersen | 340/407.1 |
| 2004/0239911 A1 * | 12/2004 | Carter et al. | 355/75 |
| 2004/0252104 A1 * | 12/2004 | Nakamura et al. | 345/160 |

FOREIGN PATENT DOCUMENTS

| | | |
|---|---|---|
| JP | 2005-4365 | 1/2005 |
| JP | 2005004365 A * | 1/2005 |

* cited by examiner

*Primary Examiner* — Matthew Fry
(74) *Attorney, Agent, or Firm* — Staas & Halsey LLP

(57) ABSTRACT

An input device including an operation portion to be operated by an external force, a signal generating portion that generates a signal according to a movement of the operation portion, and a tactile sense stimulus mechanism that applies a tactile sense stimulus to an object that applies the external force is provided. The tactile sense stimulus mechanism includes magnetic field generating portions, and a tactile sense stimulus member that is secured to a magnetic field generating portion.

9 Claims, 16 Drawing Sheets

FIG. 1    BACKGROUND
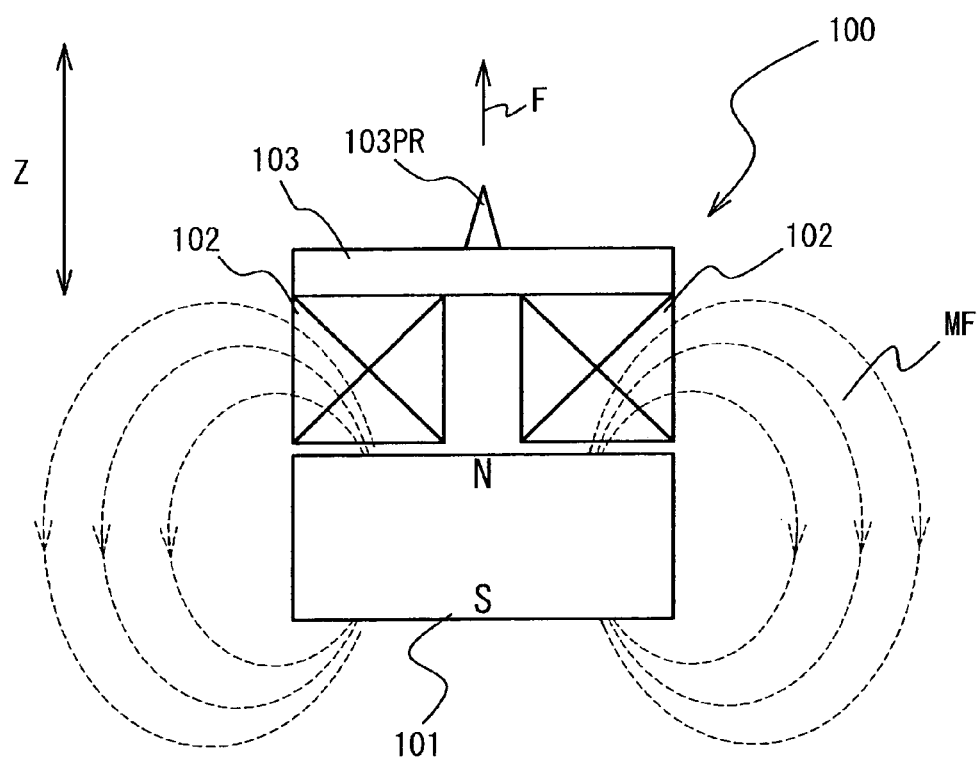

INPUT DEVICE

BACKGROUND OF THE INVENTION

1. Field of the Invention

This invention generally relates to an input device to be incorporated into an operating device such as a remote controller, mouse, or the like, which is used for inputting an instruction into an electronics device such as a personal computer, PDA, mobile telephone, automobile navigation system, television, and the like, and more particularly, to an input device that is capable of confirming that the user has performed a given operation.

2. Description of the Related Art

A mouse, for example, is coupled with a personal computer to output positional information or information that indicates a direction and move the pointer or cursor being displayed on the display to a given position. An input device is incorporated so that an instruction signal may be generated by the operating device such as the afore-described mouse. The input device is composed of an operating portion and a signal generating portion. The operating portion is moved by an operator's finger or the like, and the signal generating portion generates a signal according to the movement of the operating portion.

The input device includes a tiltable key top, a permanent magnet secured to the key top, and an electromagnetic conversion element such as a hole element provided on a position within a range of the magnetic field of the afore-mentioned magnet. The electromagnetic conversion element outputs an electrical signal according to the change in the position of the permanent magnet, and it is possible to move the pointer with the use of the signal. Generally, the operator visually checks the movement of the pointer being displayed on the display. Also, there is another type of input device that emits a rhythm sound to apply stimulus to auditory sense when the pointer moves from one region to another on the display, so that the operator can confirm the operation.

Meanwhile, when the operator operates on the display screen for a long time and becomes tired, the visual or auditory perception is weakened. This sometimes degrades the confirmation performance in operation. Japanese Patent Application Publication No. 2005-4365 (hereinafter, referred to as Document 1) proposes an input device equipped with a tactile sense stimulus device that applies stimulus to the operator's finger. The tactile sense stimulus device provides stimulus to the finger that is implementing the operation. The operator focuses attention on the finger during the operation. This makes the finger sensitive to the stimulus, so the operator can check the operation. Also, the input device described in Document 1 utilizes the permanent magnet for tactile stimulation, whereas the permanent magnet is used for outputting the instruction signals. This leads to downsizing.

FIG. 1 schematically shows a fundamental configuration of the input device described in Document 1. An input device 100 includes a permanent magnet 101 and a drive coil 102. The drive coil 102 is provided above the permanent magnet 101, and is wound round in a ring shape. When the drive coil 102 is activated to generate the magnetic field, a thrust F is also generated upwardly with the permanent magnet 101. A tactile sense stimulus member 103 having a projection 103PR, which applies stimulus to the finger, is secured to an upper side of the drive coil 102. Accordingly, the tactile sense stimulus member 103 moves upwardly together with the drive coil 102, so the projection 103PR can provide stimulus to the operator's finger.

It is to be noted that the permanent magnet 101 and the coil 102 are arranged in series in a moving direction Z of the coil 102, in the configuration shown in FIG. 1. Therefore, the range covered by a magnetic field MF of the permanent magnet 101 changes, according to the position to which the coil 102 moves. Specifically, as the position of the coil 102 becomes farther from the permanent magnet 101, the thrust F is reduced. On the upmost position that is the farthest from the permanent magnet 101, it is necessary to design the permanent magnet and coil to be large in size in order to obtain a desired thrust F, which is a force to push the finger. This causes the input device to be large in size. Besides, as shown in FIG. 1, the permanent magnet 101 and the coil 102 arranged in series is space-consuming in upward and downward directions. This also causes the input device to be large in size.

SUMMARY OF THE INVENTION

It is therefore an object of the present invention is to solve the above-described problem.

It is another object of the present invention to provide a small-sized input device having tactile sense stimulus capabilities and obtain a stable thrust.

The afore-mentioned objects of the present invention can be achieved by an input device including: an operation portion to be operated by an external force; a signal generating portion that generates a signal according to a movement of the operation portion; and a tactile sense stimulus mechanism that applies a tactile sense stimulus to an object that applies the external force. The tactile sense stimulus mechanism includes a first magnetic field generating portion, a second magnetic field generating portion, and a tactile sense stimulus member; the first magnetic field generating portion has a North magnetic pole and a South magnetic pole that are arranged at given intervals to face each other; the second magnetic field generating portion is interposed between the North magnetic pole and the South magnetic pole to be movably provided in perpendicular to a direction that connects the North magnetic pole and the South magnetic pole; and the tactile sense stimulus member is secured to either the first magnetic field generating portion or the second magnetic field generating portion.

The afore-mentioned objects of the present invention can be achieved by an operating apparatus having the afore-described input device.

BRIEF DESCRIPTION OF THE DRAWINGS

Preferred embodiments of the present invention will be described in detail with reference to the following drawings, wherein:

FIG. 1 schematically shows a fundamental configuration of a conventional input device;

DESCRIPTION OF THE PREFERRED EMBODIMENTS

A description will now be given, with reference to the accompanying drawings, of embodiments of the present invention.

First Embodiment

Figure 2A:
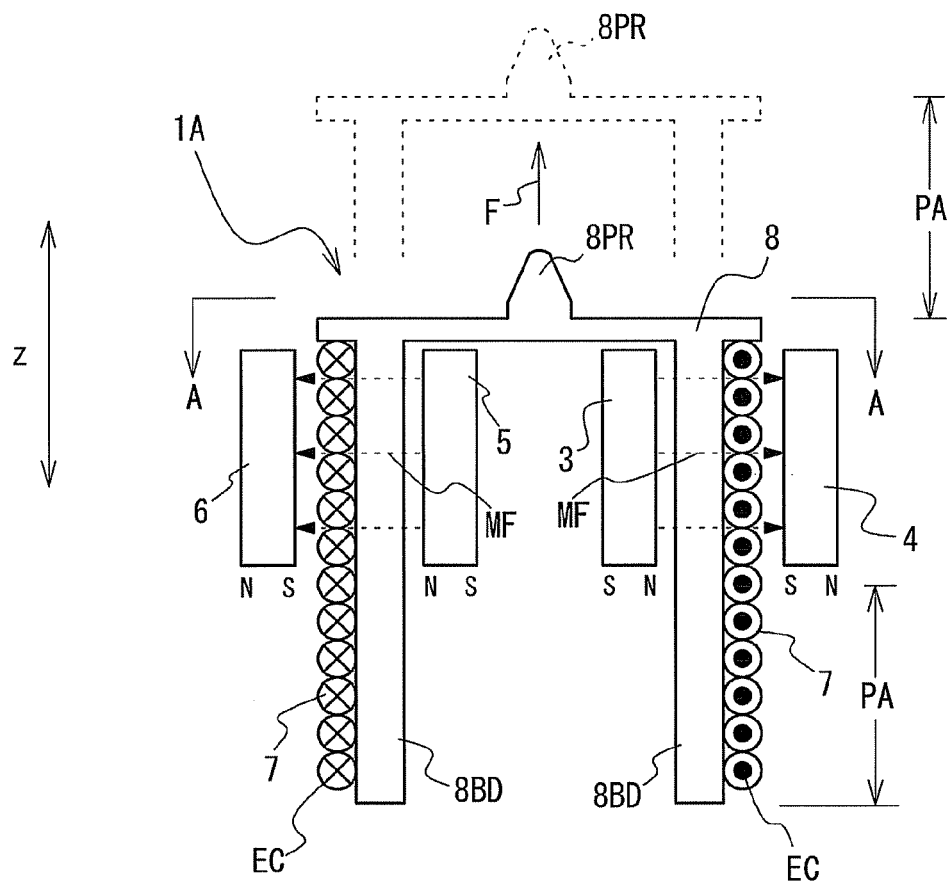
FIG. 2A and FIG. 2B show an input device in accordance with a first embodiment of the present invention.
Figure 2B:
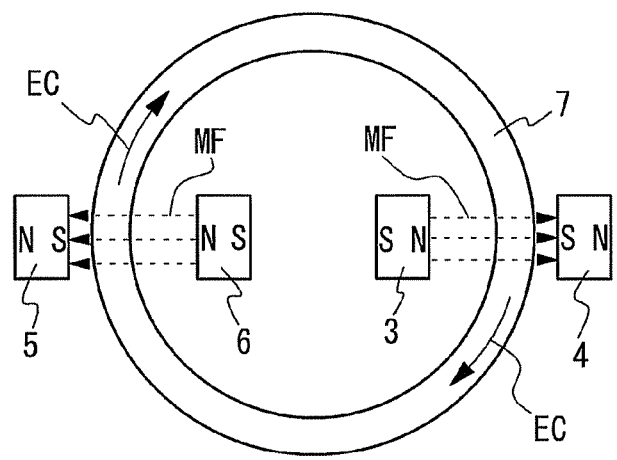

FIG. 2A and FIG. 2B show an input device 1A in accordance with a first embodiment of the present invention. FIG. 2A schematically shows main components of the input device 1A. FIG. 2B is a view showing positional relationship between a drive coil and permanent magnets when the input device 1A is viewed in a direction of A.

The input device 1A includes four permanent magnets 3, 4, 5, and 6, a drive coil 7, and a tactile sense stimulus member 8. The tactile sense stimulus member 8 substantially has a cylindrical shape, and an upper end thereof is closed. A projection 8PR is provided in the center of the upper end to project upwardly. There is a space in the tactile sense stimulus member 8 having an open lower end.

The drive coil 7 that serves as a second magnetic field generating portion is wound in a spiral manner on an outer surface of a body 8BD of the tactile sense stimulus member 8. Therefore, when the drive coil 7 is moved by the thrust, the tactile sense stimulus member 8 also moves in an integrated manner. In FIG. 2A, upward and downward directions correspond to a moving direction Z of the tactile sense stimulus member 8.

As shown in FIG. 2A and FIG. 2B, the permanent magnets 3 and 4 form a pair having the drive coil 7 interposed therebetween, and the permanent magnets 5 and 6 also form another pair. The permanent magnets that form a pair are respectively arranged to face each other at a given distance. The permanent magnet 3 has an opposed surface of the North magnetic pole, and the permanent magnet 4 has an opposed surface of the South magnetic pole. Similarly, the permanent magnet 5 has an opposed surface of the North magnetic pole, and the permanent magnet 6 has an opposed surface of the South magnetic pole. Here, the permanent magnets 3 and 4 and the permanent magnets 5 and 6 respectively serve as a first magnetic field generating portion. The afore-described moving direction Z is perpendicular to a direction that connects the North magnetic pole of the permanent magnet 3 and the South magnetic pole of the permanent magnet 4. Similarly, the afore-described moving direction Z is perpendicular to a direction that connects the North magnetic pole of the permanent magnet 5 and the South magnetic pole of the permanent magnet 6.

The tactile sense stimulus member 8 is designed to move in a movable range PA in the moving direction Z. To correspond to this, the drive coil 7 is wound outside the body 8BD to have the size (length) in the moving direction Z to be equal or slightly longer than the movable range PA.

As described, the input device 1A has a structure in which the drive coil 7 that serves as the second magnetic field generating portion is arranged between the permanent magnets 3 and 4 and between the permanent magnets 5 and 6, which respectively serve as the first magnetic field generating portion. The length of the input device 1A is reduced in the moving direction Z, as compared to a case where the permanent magnets and the drive coil are arranged in series. Accordingly, the input device 1A has a configuration that is downsized.

Here, a tactile sense stimulus mechanism includes the first magnetic field generating portion, the second magnetic field generating portion, and the tactile sense stimulus member.

Also, the North magnetic pole of the permanent magnet 3 faces the South magnetic pole of the permanent magnet 4, and accordingly, the magnetic field MF generated therebetween is uniform. In the input device 1A, the drive coil 7 is provided to cut across such a uniform magnetic field. Therefore, a more intense thrust is obtainable when the drive coil 7 is activated to generate the magnetic field. This is based on the well-known Fleming's left-hand rule. The thrust F works upwardly on the drive coil 7, with the magnetic field MF and a direction of a current EC shown in FIG. 2A and FIG. 2B. In the input device 1A, the tactile sense stimulus member 8 is pushed upwardly with the use of the thrust F. When the drive coil 7 is activated, the tactile sense stimulus member 8 is pushed upwardly. However, when the drive coil 7 is inactivated, the drive coil 7 and the tactile sense stimulus member 8 are returned to the original positions by weights thereof.

As described above, the drive coil 7 is wound equal to or a little longer in size than the movable range PA in the moving direction Z. The drive coil is configured to be a little longer in size in this manner and the thrust F is obtainable, even if the tactile sense stimulus member 8 moves to the upmost position. It is therefore possible to apply stimulus to the operator's finger certainly. In the conventional input device, it is necessary to configure the permanent magnets and the drive coil to be large in order to prevent the thrust from attenuating when the tactile sense stimulus member 8 moves. However, the configuration shown in FIG. 2A and FIG. 2B enables the permanent magnets and the drive coil to be compact. That is to say, the input device 1A is also downsized in this point.

Figure 3:
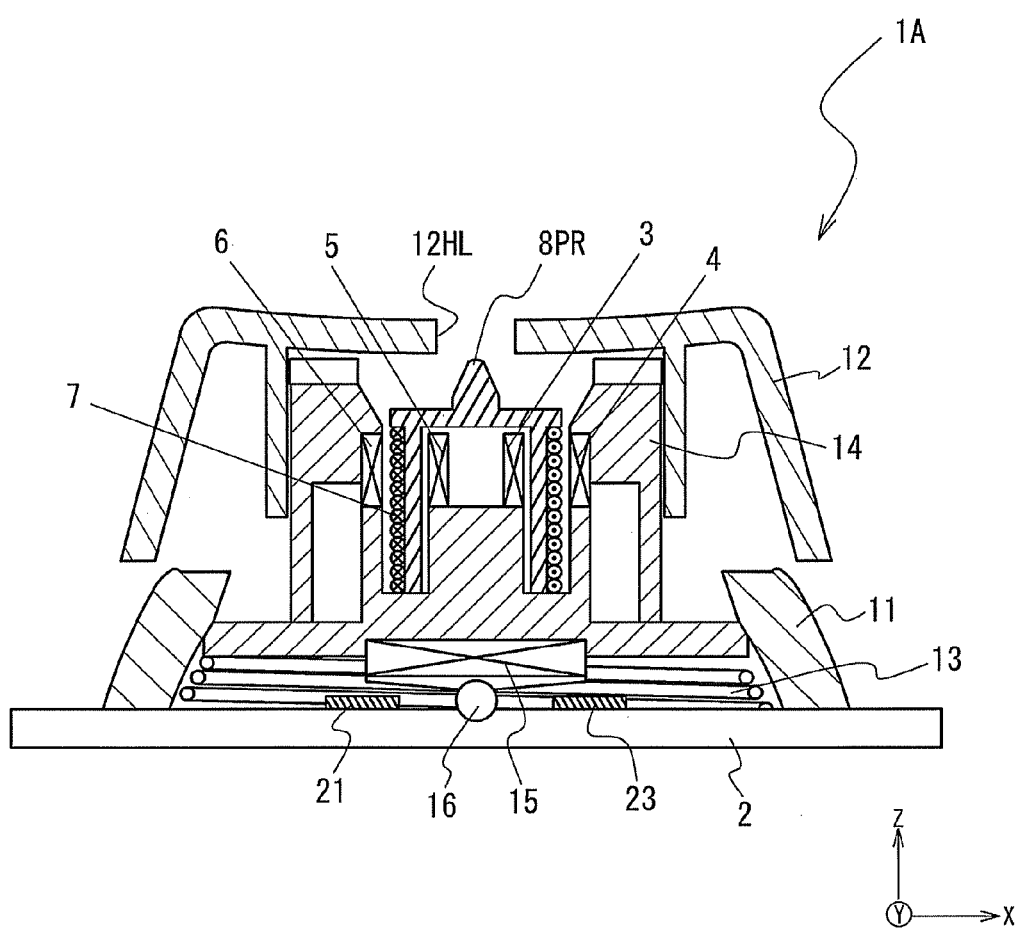
FIG. 3 shows the input device that is assembled into a product with peripheral component parts.
Figure 4:
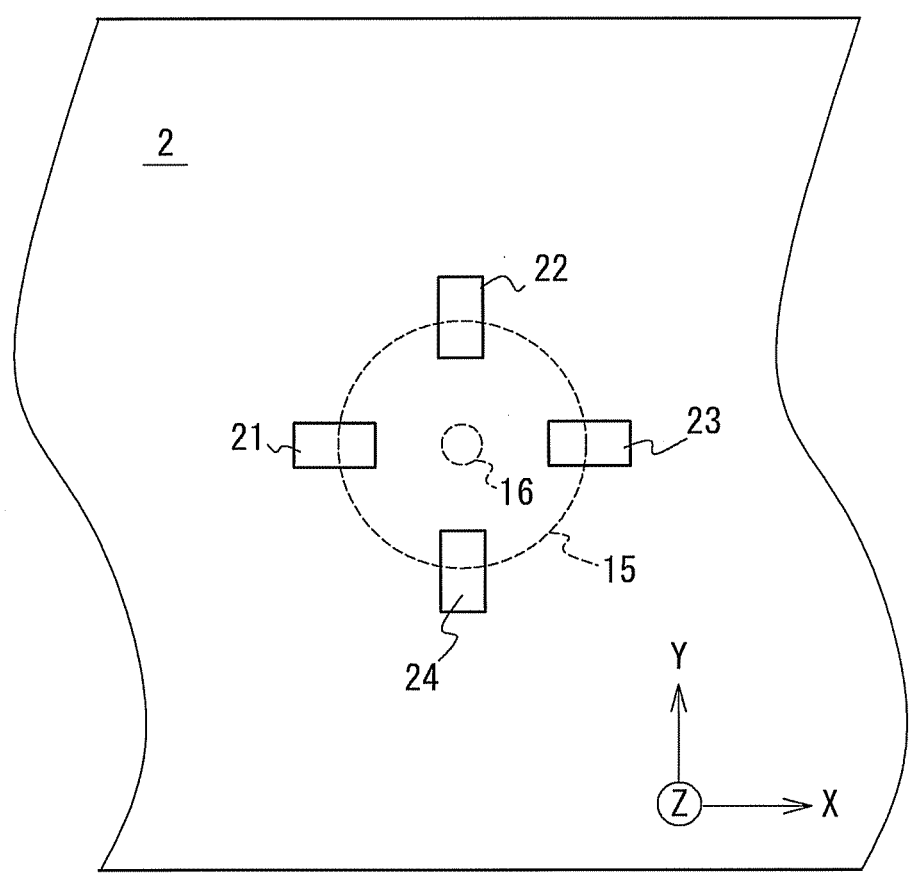
FIG. 4 shows an arrangement of hall elements of the input device shown in FIG. 3.

FIG. 3 shows the input device 1A that is assembled into a product with peripheral component parts. Multiple parts are assembled on a printed circuit board 2 on which a given wiring pattern is formed. Referring now to FIG. 4, four hall elements 21 through 24 are arranged to make a right angle with each other on the printed circuit board 2. In FIG. 3 and FIG. 4, three virtual axes X, Y, and Z are provided for explanation. Here, Z-axis corresponds to the moving direction Z of the tactile sense stimulus member 8.

The input device 1A has a housing 11 arranged on the printed circuit board 2, and a key top 12 that serves as an operation portion is provided thereabove. A coil spring 13 and a holder 14 are arranged between them. The main component parts shown in FIG. 2A and FIG. 2B are retained inside the holder 14. An opening 12HL is formed in the center of the key top 12. When the tactile sense stimulus member 8 moves upwardly, the projection 8PR projects upwardly from the opening 12HL to give stimulus to the operator's finger.

A permanent magnet 15 for position detection is secured below the holder 14. The permanent magnet 15 is tiltably arranged in the center of a supporting point 16 of the permanent magnet 15. As shown in FIG. 4, the four hall elements 21 through 24 are provided in given positions below the permanent magnet 15. When there is no power applied from the outside, the input device 1A is designed in such a manner that the coil spring 13 applies a given pushing force to a bottom face of the holder 14 to keep the holder 14 horizontal. Accordingly, the permanent magnet 15 and the hall elements 21 through 24 respectively have a constant distance, and no signal is applied from the hall elements 21 through 24. The permanent magnet 15 and the hall elements 21 through 24 compose a signal generating portion.

When the operator operates to tilt the key top 12 with the finger or the like, the permanent magnet 15 changes the position thereof according to the movement of the key top 12. Then, according to this movement, the signals are generated from the respective hall elements 21 through 24. Therefore, the operator is able to operate the key top 12 with the finger to give an instruction. In this manner, the input device 1A functions as a so-called pointing device. It is possible to move the pointer being displayed on the display to a desired position by tilting the key top 12 with the finger or the like to any arbitrary X-Y direction and output the coordinate information.

Figure 5:
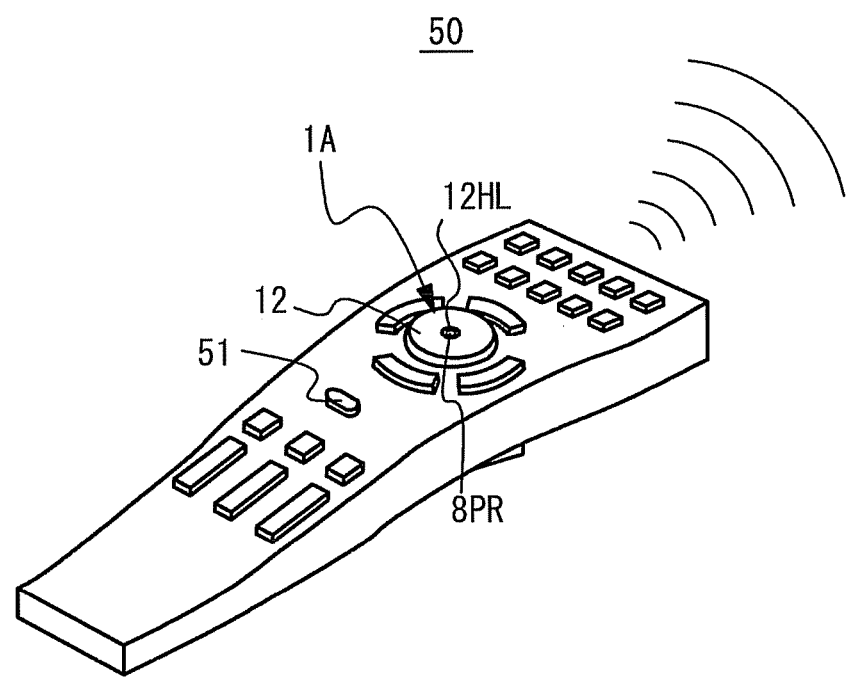
FIG. 5 is a view showing a remote controller having the input device in accordance with the first embodiment of the present invention.

The input device 1A is, for example, assembled into a remote controller 50 that serves as an operating device, as shown in FIG. 5. The input device 1A is assembled in the middle of the remote controller 50. Such assembled remote controller 50 has the key top 12 that serves as an operation portion and externally projects. The projection 8PR of the tactile sense stimulus member 8 is arranged below the opening 12HL provided in the key top 12. An execution key 51 and the like are arranged near the input device 1A.

Figure 6:
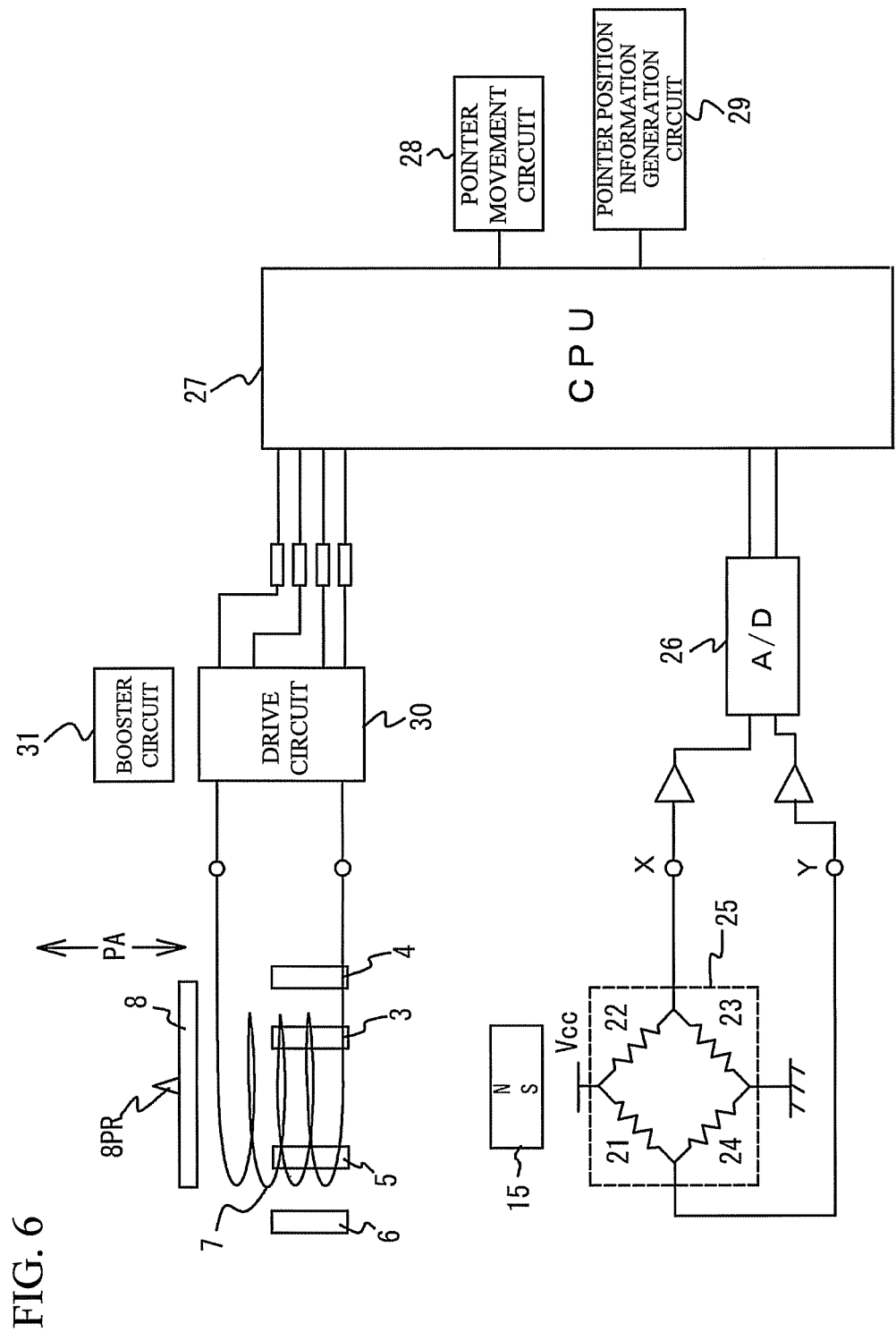
FIG. 6 is a block diagram of relating portions of the input device in the remote controller.

FIG. 6 is a block diagram of relating portions of the input device 1A in the remote controller 50. The input device 1A of the remote controller 50 is operated for moving the pointer being displayed on the computer display, which is not shown. The hall elements 21 through 24 are connected in bridge connection to form a bridge circuit 25. The bridge circuit 25 is coupled to a CPU 27 by way of an A/D converter circuit 26. The CPU 27 calculates the outputs from the hall elements 21 through 24 to generate a signal that moves the pointer being displayed on the display. The CPU 27 is configured in such a manner that the position of the pointer on the display can be monitored and the pointer that has moved to a given region can be confirmed. The CPU 27 is also connected by a pointer movement circuit 28 and a pointer position information generation circuit 29. The computer or the like to be operated is connected via the afore-described circuits. The CPU 27 is also connected to a drive circuit 30 that activates the drive coil 7. The drive circuit 30 is connected to the drive coil 7 and a booster circuit 31.

A description will be given briefly of the operation with the remote controller 50. When the operator is not operating the input device 1A of the remote controller 50, the permanent magnet 15 is maintained parallel to the printed circuit board 2, and is positioned in the center of the hall elements 21 through 24 and above the hall elements 21 through 24. The magnetic field of the permanent magnet 15 uniformly works on the hall elements 21 through 24. Accordingly, the output from the permanent magnet 15 is zero, and the output from the A/D converter circuit 26 is also zero. Therefore, the pointer on the display does not move.

The voltage that corresponds to the direction and angle of gradient of the key top 12 are output to the bridge circuit 25. On the basis of this voltage, the CPU 27 outputs an instruction to move the pointer on the display, and it is therefore possible to move the direction according to the operation of the key top 12.

Then, the CPU 27, upon confirming that the pointer has entered a given region on the display, outputs the signal to the drive circuit 30. At this time, the drive circuit 30 operates together with the booster circuit 31, and supplies the drive current to the drive coil 7 temporarily or repeatedly. The electromagnetic force applies the thrust to the drive coil 7 in the Z direction upwardly, and the projection 8PR projects from the opening 12HL in the key top 12, and gives stimulus to the operator's finger.

The input device 1A described heretofore can be formed in a small size, because the drive coil 7 is arranged between the permanent magnets 3 and 4 and between the permanent magnets 5 and 6, the North magnetic poles and south magnetic poles of which are arranged at a given distance. This makes it possible to downsize the operation apparatus such as the remote controller 50 or the like having the input device 1A. The drive coil 7 is provided long according to the movable range PA, and moves to cut across the uniform magnetic field generated between the permanent magnets that form a pair. Therefore, the thrust applied to the drive coil 7 is stronger than a case where the magnetic field is provided in the outside of the permanent magnets as in the conventional input device, and the thrust is stably maintained. Accordingly, it is possible to certainly give stimulus to the operator's finger.

Generally, the operating apparatus such as a remote controller or the like is designed such that the operator operates with the finger. A description has been given of a case where the key top 12 is operated with the finger. If the operator cannot use the finger freely, the operation may be done by the palm of the hand, arm, or toe. In other words, the operation of the key top 12 is done by not only the operator's finger but also the operator's palm of the hand or foot. Any object that applies an external force to the key top 12 is applicable.

The above description has been given to the case where the input device 1A is incorporated into the remote controller 50 and the drive coil 7 is activated to give stimulus to the operator when the pointer on the display moves into a given region. However, the input device 1A is not limited to this usage. When the key top 12 is tilted, in other words, when the operation starts, the stimulus may be given to confirm the operation. Also, when the operation starts, the stimulus may be given once. When the operation ends, the stimulus may be given twice.

Referring to FIG. 6, again, the CPU 27 of the remote controller 50 serves as a magnetic field control portion to control the current flow to the drive coil 7, yet the present invention is not limited to this configuration. The input device 1A may include the control circuit as the magnetic field control portion to control the current flow to the drive coil 7. The remote controller 50 is an example of the operating apparatus. The input device 1A may be incorporated into a main body of an electronics device such as an automobile navigation apparatus, PDA, or mobile telephone, and may be incorporated into an instruction device such as a mouse, joystick, or the like.

Second Embodiment

Figure 7A:
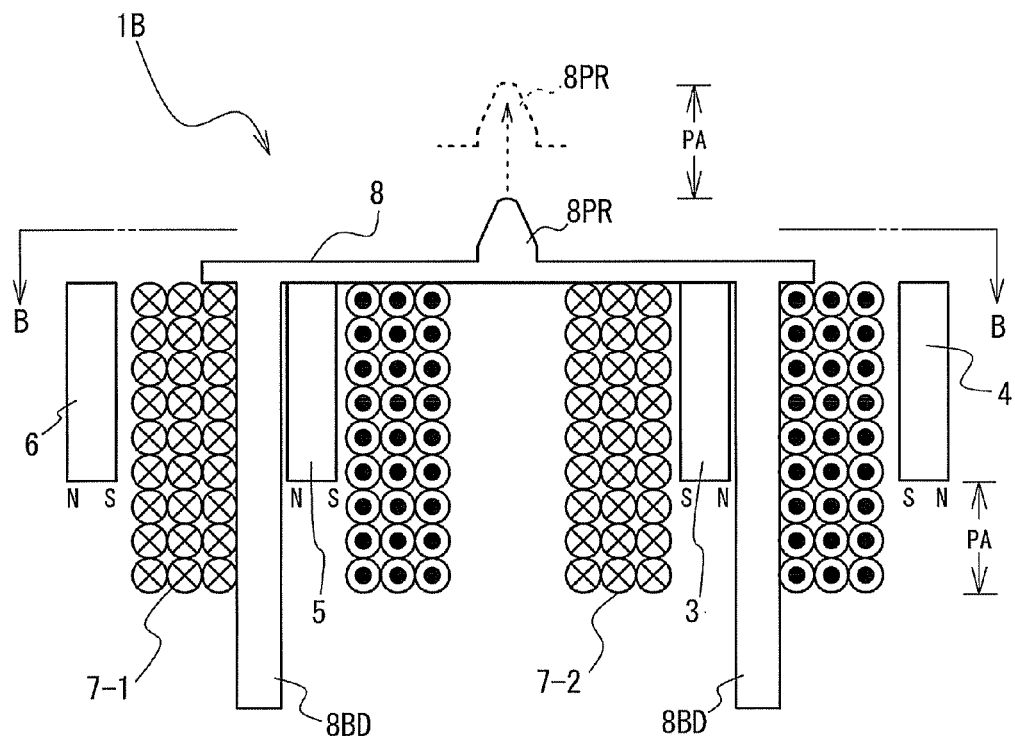
FIG. 7A and FIG. 7B show an input device in accordance with a second embodiment of the present invention.
Figure 7B:
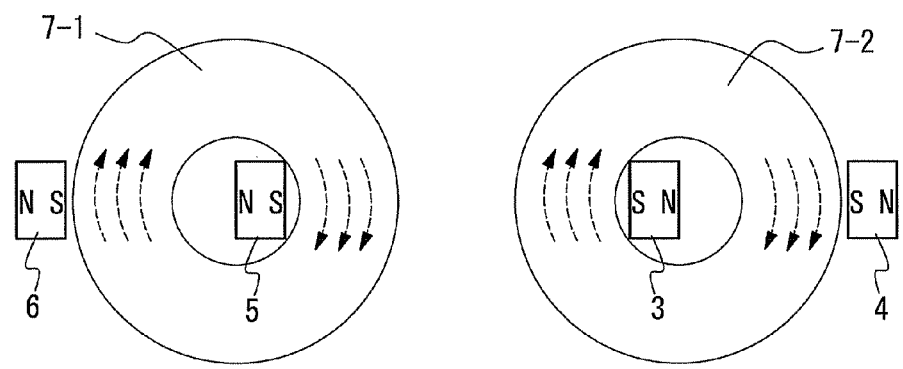

A second embodiment of the present invention will be described with reference to the drawings. Hereinafter, in the second embodiment, the same components and configurations as those of the first embodiment have the same reference numerals and a detailed explanation will be omitted. FIG. 7A and FIG. 7B show an input device 1B in accordance with the second embodiment of the present invention. FIG. 7A schematically shows main components of the input device 1B. FIG. 7B is a view showing positional relationship between the drive coil and the permanent magnets when the input device 1B is viewed in a direction of B.

The input device 1B is improved to have a greater thrust than that of the input device 1A in accordance with the first embodiment of the present invention. The input device 1B includes two drive coils 7-1 and 7-2, which are arranged on the left and on the right of the tactile sense stimulus member 8. Each of the drive coils 7-1 and 7-2 has the winding number greater than that of the drive coil 7 in accordance with the first embodiment of the present invention. Accordingly, the input device 1B is capable of obtaining a greater thrust. Each of the drive coils 7-1 and 7-2 can be arranged as shown in FIG. 7A and FIG. 7B by partially providing cutout portions in the body 8BD of the tactile sense stimulus member 8. The input device 1B also has the drive coils 7-1 and 7-2 a little longer to correspond to the movable range PA of the tactile sense stimulus member 8. Therefore, a stable thrust is obtainable and the projection 8PR is capable of giving stimulus to the finger a little strongly, as necessary. In particular, with this configuration, it is possible to change the thrust to be strong or weak by adjusting the current supplied to the drive coils 7-1 and 7-2, thereby enabling to change the stimulus to be applied to the finger or the like.

In the input device 1B, the thrust is respectively enhanced by the multiple drive coils 7 and the increased the winding period of the drive coil 7. Therefore, any one of the aforedescribed cases may be employed to enhance the thrust.

Variation Example

Figure 8:
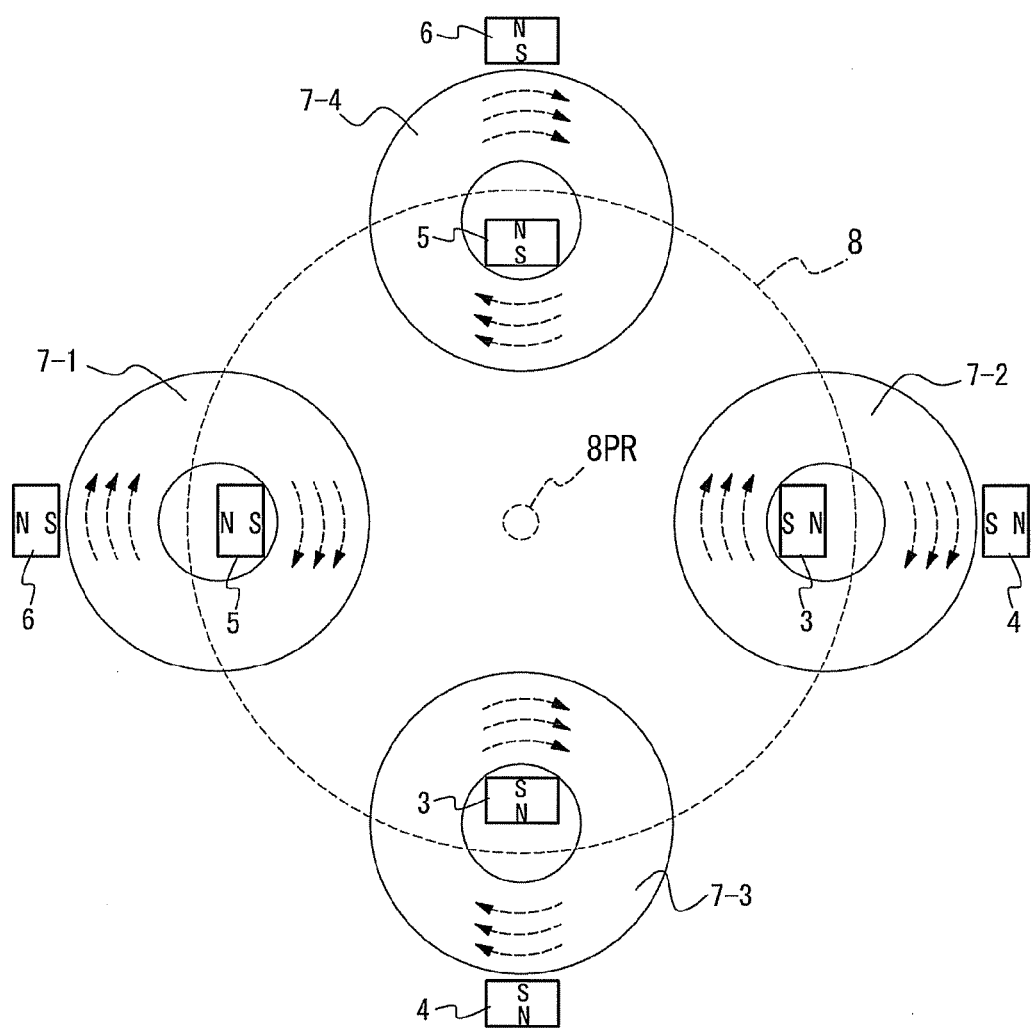
FIG. 8 is a view showing positional relationship between drive coils and permanent magnets in accordance with a variation example of the second embodiment.

A variation example of the input device 1B is described. The input device 1B shown in FIG. 7A and FIG. 7B shows a case where two drive coils 7 are provided. The number of the drive coils may be increased. FIG. 8 is a view showing the positional relationship between the drive coils and the permanent magnets in accordance with a variation example of the second embodiment. In accordance with this variation example, two drive coils are added, and four drive coils are provided in total. It is therefore possible to further enhance the thrust. Four coils 7-1 through 7-4 are symmetrically provided with respect to the projection 8PR of the tactile sense stimulus member 8, and are arranged at intervals of 90 degrees. With this configuration, the tactile sense stimulus member 8 is supported and pushed up by a plane surface, thereby enabling to move the pointer stably. In this variation example, the drive coils 7-3 and 7-4 are newly added, and accordingly, two pairs of the permanent magnets are added. The permanent magnets 3 through 6 are provided as the originally provided two pairs. FIG. 8 shows an example in which four drive coils 7 are provided. However, three drive coils 7 may be arranged at intervals of 120 degrees. Five or more drive coils 7 may be provided.

Third Embodiment

Figure 9:
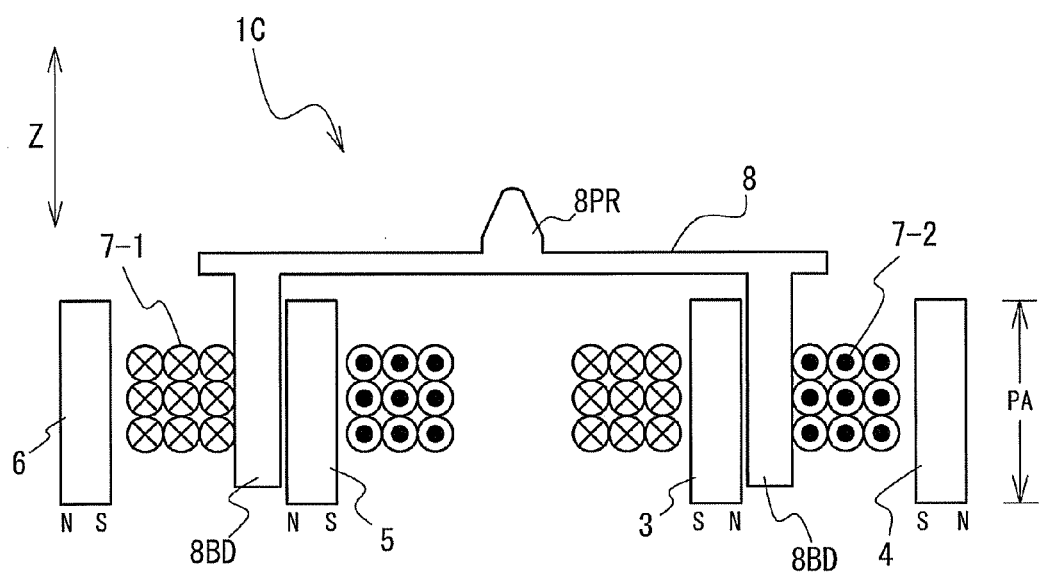
FIG. 9 is a view showing an input device in accordance with a third embodiment of the present invention.

FIG. 9 is a view showing an input device 1C in accordance with a third embodiment of the present invention. In the input device 1C, the tactile sense stimulus member 8 of the movable range PA corresponds to the length of the permanent magnets 3 through 6 in Z direction (moving direction). In this input device 1C, the range (length) around which the coils can be wound is shorter, yet the coil is multiply wound to obtain a necessary magnetic field. The input device 1C can be downsized by setting the size in height to be almost equal to those of the permanent magnets 3 through 6 to obtain a desired thrust. In addition, if the size of the permanent magnets 3 through 6 is set longer, it is possible to arbitrarily lengthen the movable range PA of the tactile sense stimulus member 8.

Fourth Embodiment

Figure 10:
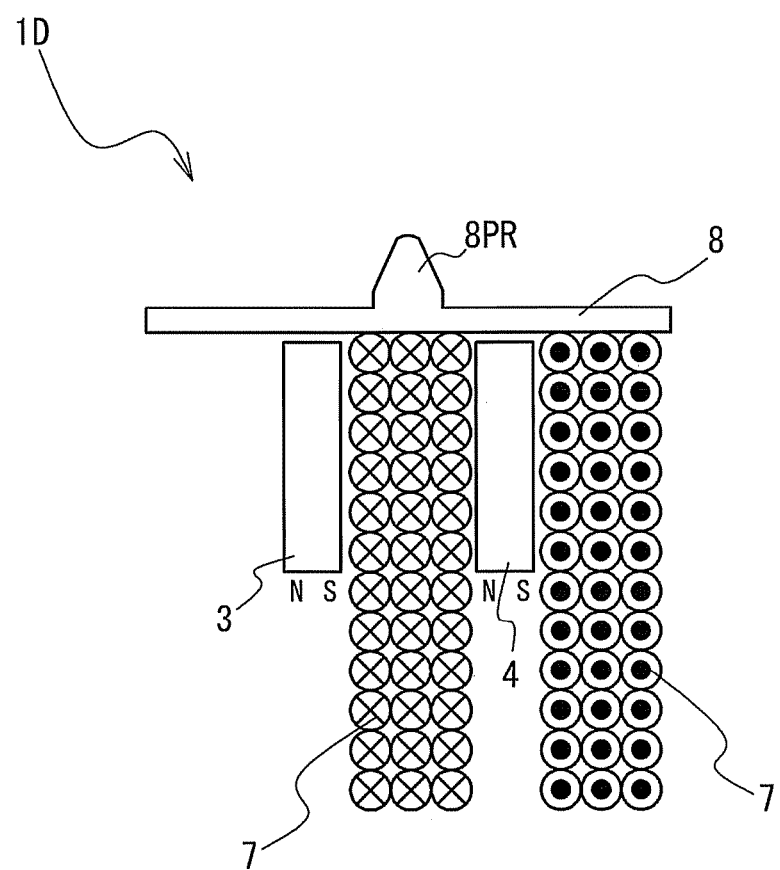
FIG. 10 is a view showing an input device in accordance with a fourth embodiment of the present invention.

FIG. 10 is a view showing an input device 1D in accordance with a fourth embodiment of the present invention. The input device 1D is downsized in a direction of width. Accordingly, there is provided only one pair of the permanent magnets 3 and 4. The drive coil 7 is arranged below the projection 8PR to transmit the thrust to the tactile sense stimulus member 8 for certainty. A necessary magnetic field is obtainable by multiply winding the drive coil 7. The input device 1D can be formed "slim" or vertically long to be positioned in a narrow space.

Fifth Embodiment

Figure 11:
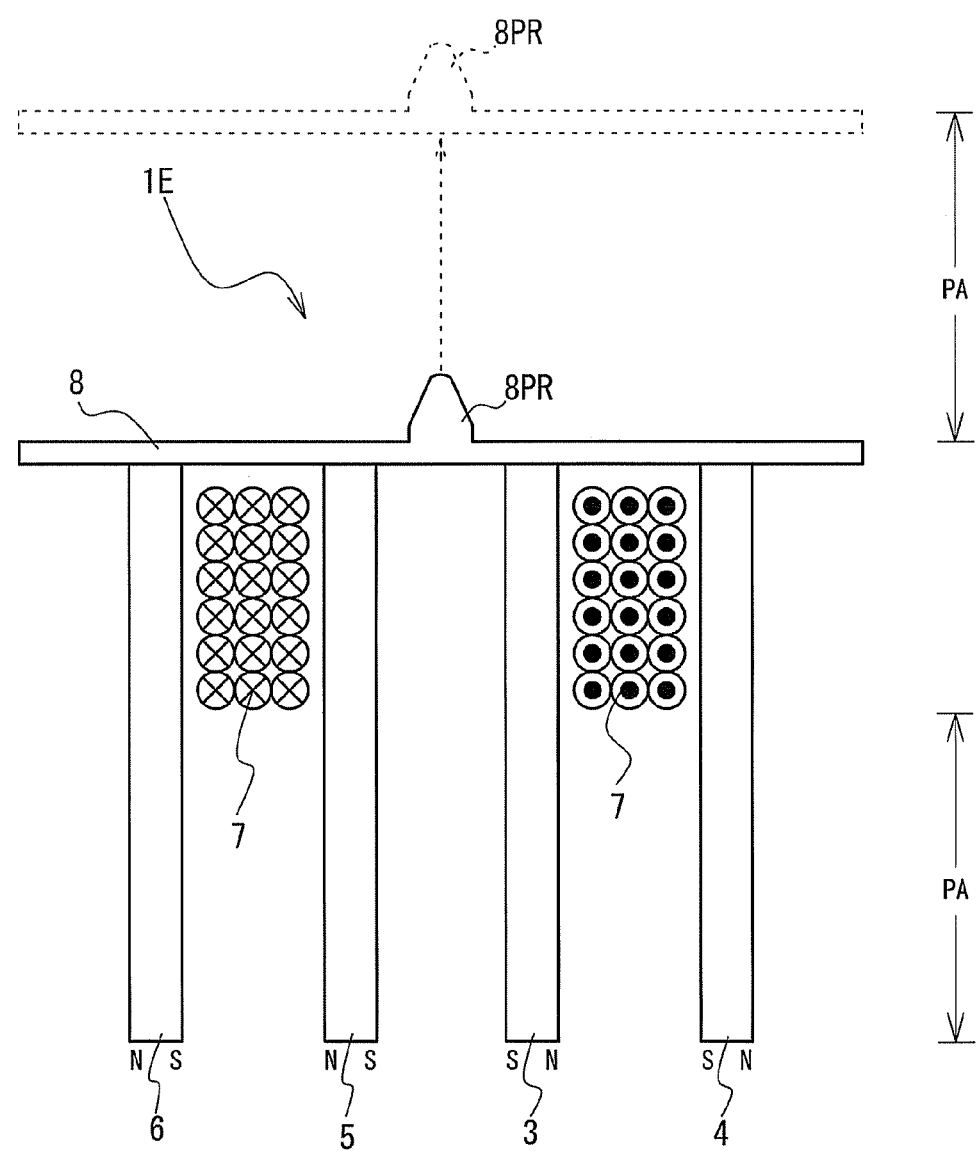
FIG. 11 is a view showing an input device in accordance with a fifth embodiment of the present invention.

FIG. 11 is a view showing an input device 1E in accordance with a fifth embodiment of the present invention. The input device 1E is different from the above-described input devices 1A through 1D in that the drive coil 7 is provided at a fixed position and the permanents magnets 3 through 6 move. Therefore, in the input device 1E, the permanent magnets 3 through 6 are configured longer to correspond to the movable range PA of the tactile sense stimulus member 8. The drive coil 7 has to be connected by a wiring to supply the current from the outside, which is not shown. It is therefore possible to prevent the disconnection of the wiring by employing the configuration in which the drive coil 7 is provided at a fixed position. This enhances the durability of the input device 1E. The drive coil 7 may be retained stably by being fixed to the holder 14 or the like (see FIG. 3).

In the input device 1E, the permanent magnets 3 through 6 move, while maintaining a state where the drive coil 7 cuts across the uniform magnetic field generated between the permanent magnets 3 and 4 and that between the permanent magnets 5 and 6. The thrust that works on the drive coil 7 is enhanced and the thrust can be maintained uniformly. If the drive coil 7 is provided between the permanent magnets 3 and 4 and between the permanent magnets 5 and 6, the same effects are obtainable as those described in the above embodiments and the input device 1E can be downsized.

Figure 12A:
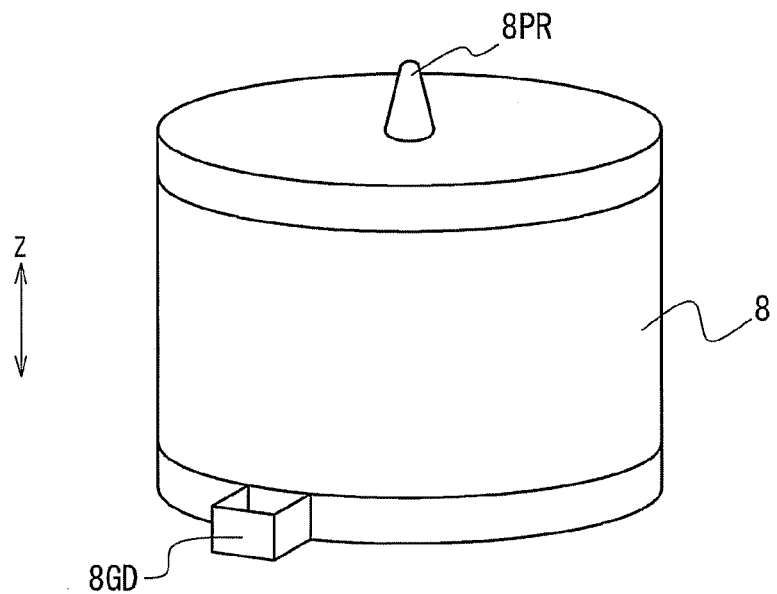
FIG. 12A and FIG. 12B show a preferred embodiment to be applied to the input device.
Figure 12B:
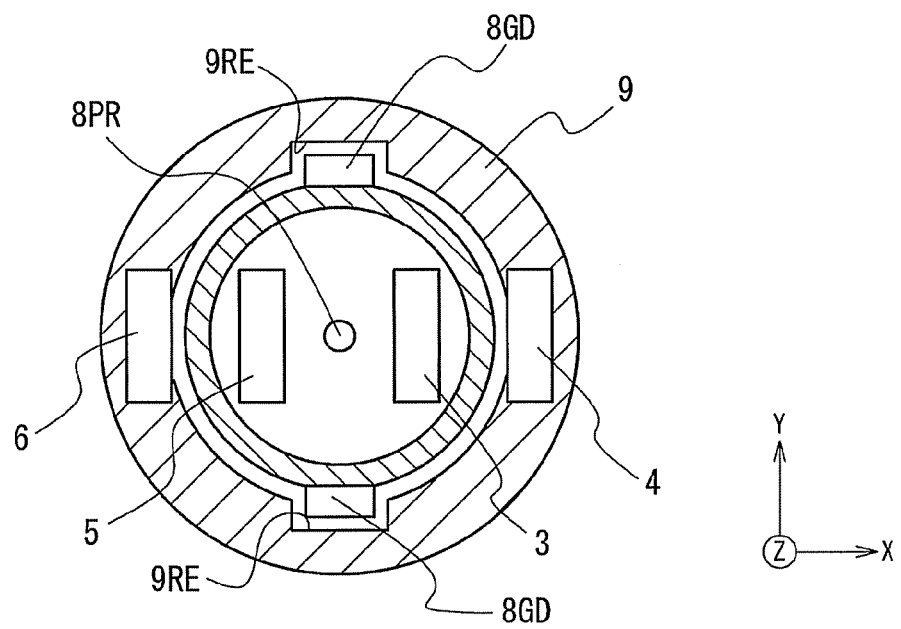

Hereinafter, other preferred embodiments of the above-described input device will be described, with reference to the drawings. First, FIG. 12A and FIG. 12B show a guide structure that moves the tactile sense stimulus member 8 in the moving direction Z, whereas preventing the rotation of the tactile sense stimulus member 8. FIG. 12A is a perspective view showing an outer appearance of the tactile sense stimulus member 8. FIG. 12B is a plan view showing a state where the tactile sense stimulus member 8 is housed in a chassis 9.

The tactile sense stimulus member 8 has a pair of guide protrusions 8GD that externally protrude. FIG. 12A shows a front side thereof. On the other hand, as shown in FIG. 12B, a recess 9RE is formed to receive the guide protrusions 8GD of the tactile sense stimulus member 8 on the inner surface of the chassis 9. Since the tactile sense stimulus member 8 is allowed to move only in Z direction, the tactile sense stimulus member 8 is not misaligned or rotated during the movement. It is preferable that the guide structure should be arranged between the chassis 9 and the tactile sense stimulus member 8, because it is possible to operate the tactile sense stimulus member 8 stably. As shown in FIG. 12A and FIG. 12B, the tactile sense stimulus member 8 is housed in the chassis 9, yet if the chassis 9 is replaced by the holder 14 shown in FIG. 2A and FIG. 2B, the tactile sense stimulus member 8 is applicable to the input devices in accordance with the embodiments described above.

Figure 13A:
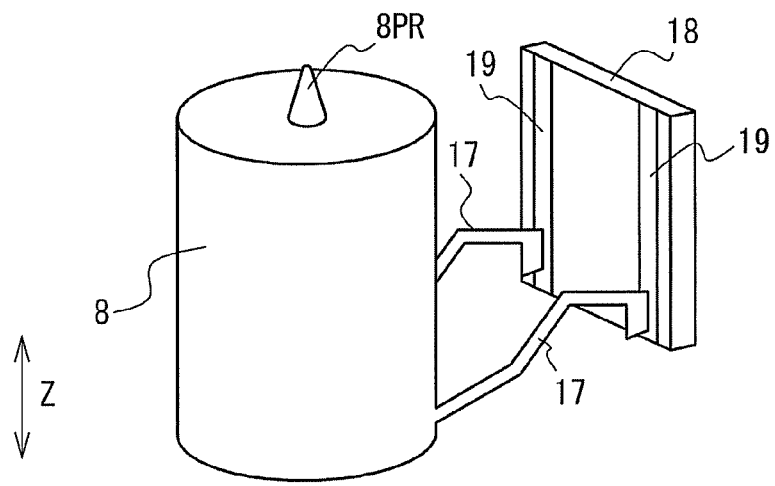
FIG. 13A through FIG. 13C show another preferred embodiment to be applied to the input device.
Figure 13B:
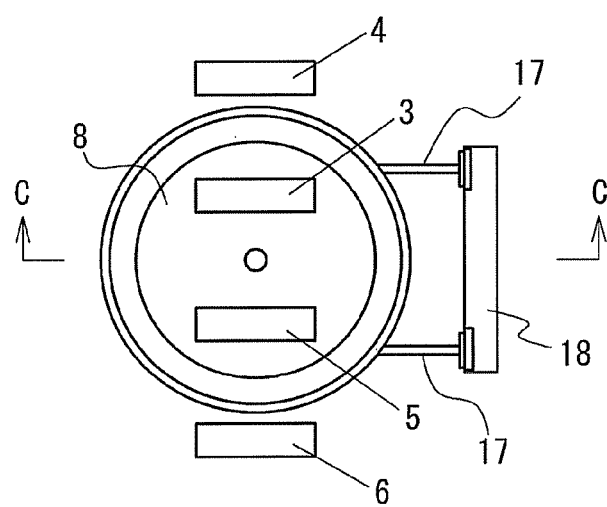
Figure 13C:
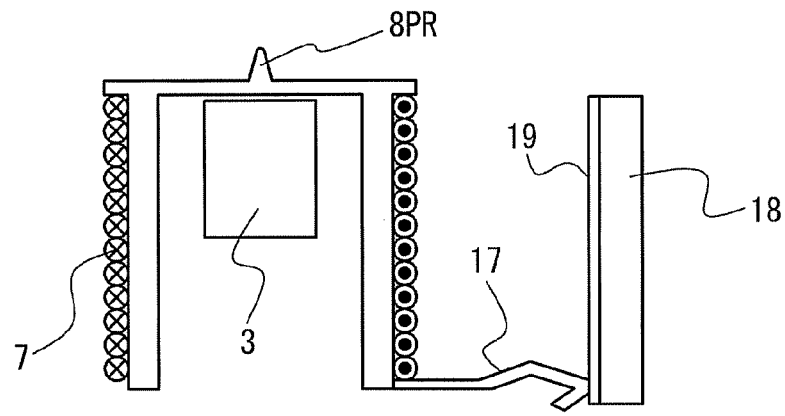

Next, a description will be given of a preferred current supply to the drive coil 7 provided in the tactile sense stimulus member 8. In the input devices 1A through 1D, the thrust is applied to the drive coil 7 to move in the moving direction Z. The drive coil 7 has to be wired to generate the magnetic field, however, it is preferable that the wiring should not be disconnected during the movement. FIG. 13A is a perspective view showing a periphery of the tactile sense stimulus member 8. FIG. 13B is a plan view thereof. FIG. 13C is a view when viewed in a direction of C.

FIG. 13A through FIG. 13C show terminals 17 that move like a spring and are connected to the drive coil 7. The terminals 17 externally extend from the tactile sense stimulus member 8. The other ends of the terminals 17 are slidably in contact with wiring patterns 19 on a circuit board 18. With the afore-described current supply structure, it is possible to prevent the disconnection as a structure that moves the drive coil 7.

Figure 14:
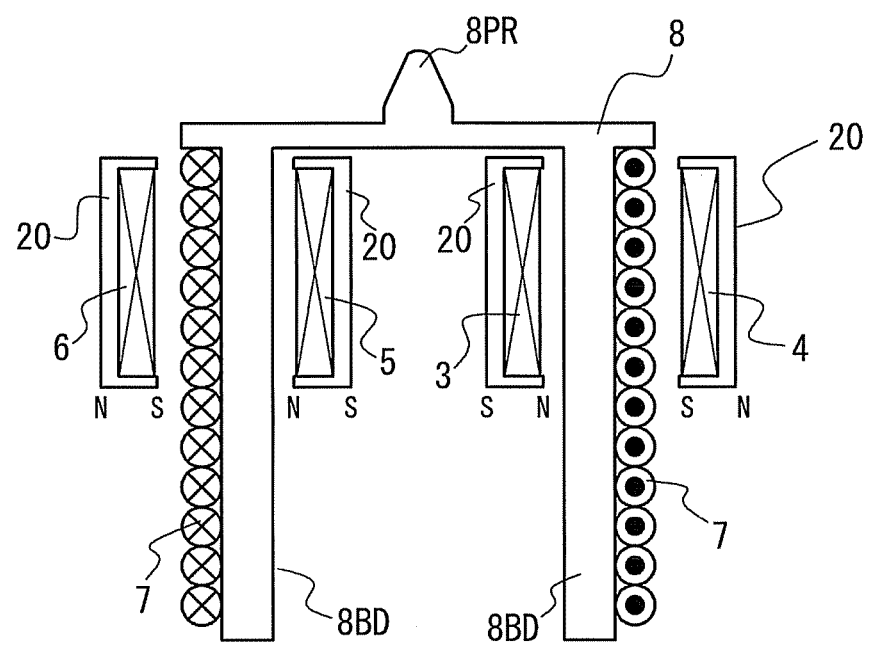
FIG. 14 shows another preferred embodiment to be applied to the input device.

Next, a description will be given of a preferred embodiment of the permanent magnet. FIG. 14 shows an example that includes a yoke 20 in addition to the input device 1A in accordance with the first embodiment of the present invention. The yoke 20 guides the magnetic field to the permanent magnets 3 through 6. Such provided yoke 20 is capable of suppressing the leak of the magnetic field to the periphery. In particular, in a configuration where the permanent magnet 15 for position detection is separately provided as described above and the detection is performed by the hall elements 21 and 22, it is possible to prevent the effects of the permanent magnets 3 through 6 that are provided for driving the tactile sense stimulus member 8.

Figure 15:
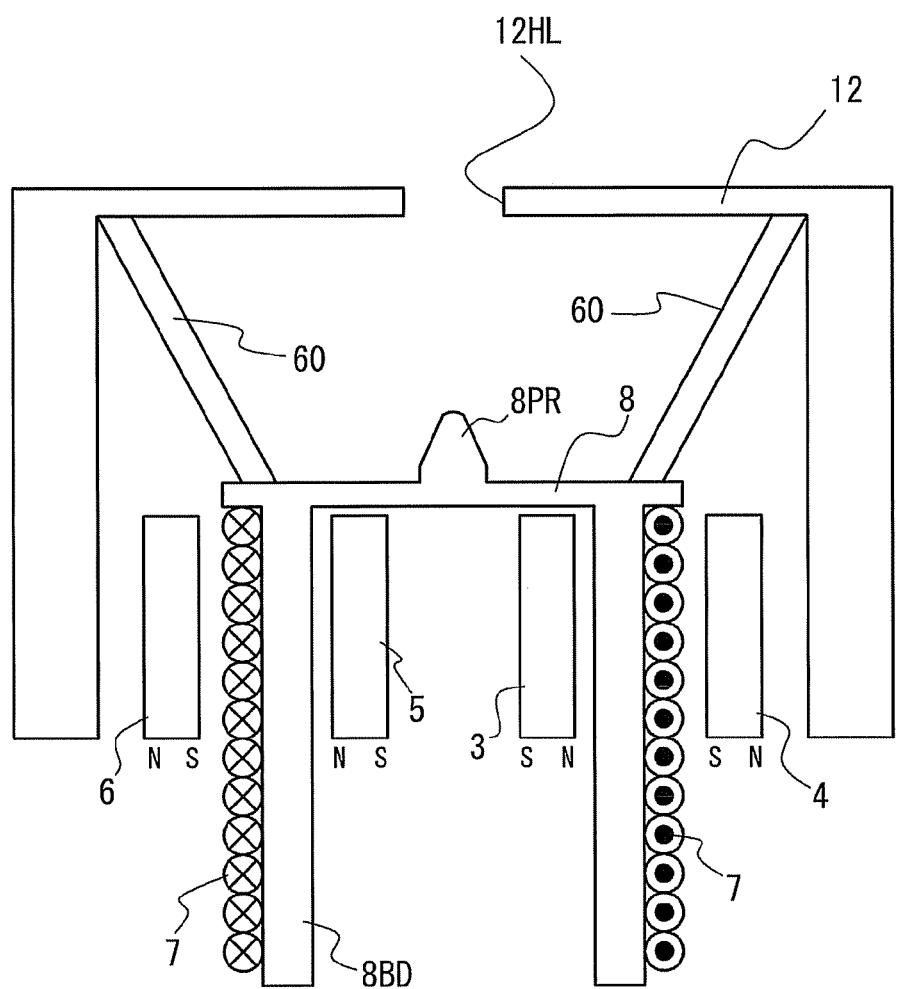
FIG. 15 shows another preferred embodiment to be applied to the input device.

In addition, a description will be given of an example where the tactile sense stimulus member 8 is restored to a given position. In this example, an elastic deformation member is added to the tactile sense stimulus member 8. FIG. 15 is a view showing an example that includes a rubber dumper 60, which is arranged between the key top 12 of the input device 1A and the tactile sense stimulus member 8. The rubber dumper 60 operates in such a manner that the tactile sense stimulus member 8 is maintained at a given position, while the thrust is not generated in the drive coil 7. Accordingly, even if the input device 1A is left at a tilt, it is possible to restore the tactile sense stimulus member 8 to a fixed position.

Figure 16:
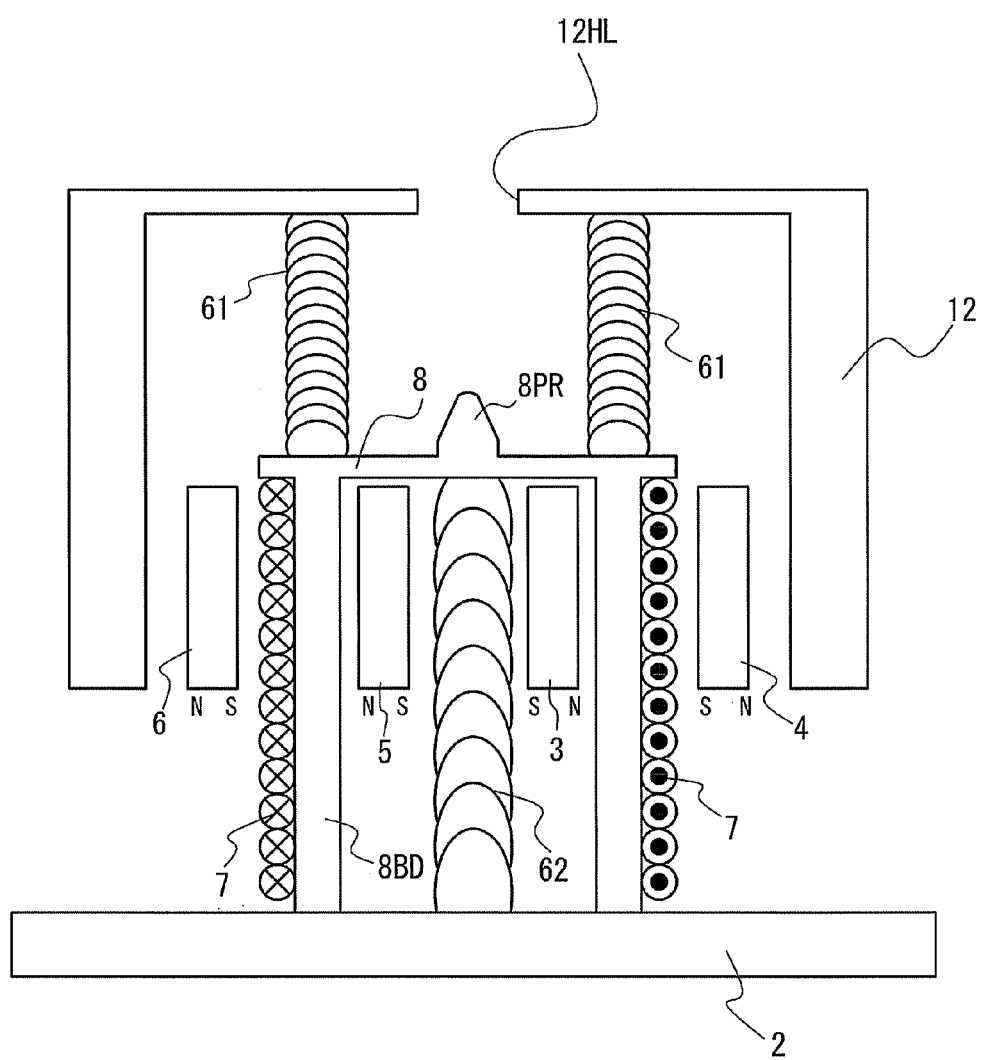
FIG. 16 shows another preferred embodiment to be applied to the input device.

FIG. 16 is view showing an example in which the tactile sense stimulus member 8 is restored to a given position by use of a spring. A first coil spring 61 is arranged between the key top 12 and tactile sense stimulus member 8 in the input device 1A, and a second coil spring 62 is arranged between the board 2 and the tactile sense stimulus member 8. While the thrust is not generated in the drive coil 7, the coil springs 61 and 62 operate in such a manner that bias forces thereof are balanced to maintain the tactile sense stimulus member 8 at a given position. It is thus possible to restore the tactile sense stimulus member 8 to a fixed position, even if the input device 1A is left at a tilt.

In accordance with the above-described embodiments, the permanent magnets 3 and 4 and the second magnets 5 and 6 are exemplarily described as the first magnetic field generating portion, in which the North magnetic pole and the South magnetic pole face each other at given intervals. However, the first magnetic field generating portion is not limited to the permanent magnets, and electromagnets may be employed. If the electromagnets are employed, it is possible to adjust the magnetic field generated by the current to be supplied to the coil, thereby enabling the thrust F of the tactile sense stimulus member 8 to a desired strength. The current supplied to the coil may be controlled by the magnetic field control portion. As described in the first embodiment of the present invention, the CPU provided on the operation apparatus that incorporates the input device 1A, such as a remote controller, may serve as the magnetic field control portion, or a magnetic field control circuit may be provided on the input device.

In accordance with the present invention, the second magnetic field generating portion is arranged between the North magnetic pole and the South magnetic pole of the first magnetic pole generating portion, enabling the input device to be smaller. Also, the North magnetic pole and the South magnetic pole are provided to face each other, making the magnetic field MF uniform. The second magnetic field generating portion is arrange to cross such a uniform magnetic field at a right angle, making it possible to apply a greater thrust than the conventional input device to the tactile sense stimulus member.

The operating apparatus having the above-described input device can be downsized and apply stimulus stably to the operator for the confirmation of the operation.

In accordance with the present invention, it is possible to provide a small-sized input device having the tactile sense stimulus mechanism by which the thrust is obtainable.

The present invention is not limited to the above-mentioned embodiments, and other embodiments, variations and modifications may be made without departing from the scope of the present invention.

The present invention is based on Japanese Patent Application No. 2005-096373 filed on Mar. 29, 2005, the entire disclosure of which is hereby incorporated by reference.

What is claimed is:

1. An input device, comprising:
    an operation portion to be operated by an external force, the operation portion including an opening formed through a surface of the operating portion in a center thereof;
    a signal generating portion that generates a signal according to a movement of the operation portion;
    a tactile sense stimulus mechanism that applies a tactile sense stimulus to an object that applies the external force, the tactile sense stimulus mechanism comprising:
        a first magnetic field generating portion,
        a second magnetic field generating portion, and
        a tactile sense stimulus member including a projection, the projection being configured to project upwardly from a position below the surface of the operation portion and the opening and be exposed above the surface of the operation portion and the opening when the tactile sense stimulus member moves upwardly and to retract below the surface of the operation portion and the opening when the tactile sense stimulus member moves downwardly;
    wherein the first magnetic field generating portion includes at least two pairs of magnets, each pair having a North magnetic pole and a South magnetic pole that are arranged at given intervals to face each other, and
    the second magnetic field generating portion includes a coil and two terminals, each terminal being connected to a different end of the coil and externally extending from the tactile sense stimulus member to be slidably in contact with a wiring pattern for supplying an electric current, wherein the coil is secured to the tactile sense stimulus member so as to be wound around one of the magnets of each respective pair of magnets and such that the coil is interposed between the North magnetic pole and the South magnetic pole of the respective pair of magnets to be movably provided in perpendicular to a direction that connects the North magnetic pole and the South magnetic pole and such that the one magnet of the respective pair is not centered with respect to the respective coil, and a length of the first magnetic field generating portion is shorter than a length of the second magnetic field generating portion in a movable direction of the tactile sensor member and longer than a maximum movable range of the tactile sensor member, and the length of the second magnetic field generating portion is longer in the movable direction of the tactile sensor member than the maximum movable range of the tactile sensor member.

2. The input device as claimed in claim 1, further comprising a magnetic field control portion that changes at least one of the first magnetic field generating portion and the second magnetic field generating portion.

3. The input device as claimed in claim 1, wherein
the coil generates a magnetic field when activated and has a length in a moving direction associated with a movable range of the second magnetic field generating portion with respect to the first magnetic field generating portion.

4. The input device as claimed in claim 3, wherein
the coil includes a portion wound around in a spiral manner.

5. The input device as claimed in claim 3, wherein
the coil includes a portion wound around in a spiral manner, and
the first magnetic field generating portion has magnetic field generating portions provided along the coil.

6. The input device as claimed in claim 3, wherein:
the first magnetic field generating portion includes magnetic field generating portions that are symmetrically provided with respect to the projection.

7. The input device as claimed in claim 1, wherein
the first magnetic field generating portion has a length in a moving direction associated with a movable range of the second magnetic field generating portion with respect to the first magnetic field generating portion.

8. The input device as claimed in claim 1, further comprising a yoke that induces magnetism around the North magnetic pole and the South magnetic pole of each of the pair of magnets.

9. The input device as claimed in claim 1, further comprising:
a guide structure interposed between a chassis and the tactile sense stimulus member to guide the tactile sense stimulus member to a given direction, the guide structure including a guide protrusion of the tactile stimulus member that externally protrudes, and a recess formed on the inner surface of the chassis to receive the guide protrusion.

* * * * *